United States Patent [19]

Saavedra et al.

[11] Patent Number: 4,861,805
[45] Date of Patent: Aug. 29, 1989

[54] ANTISTATIC POLYURETHANE SHOE SOLE COMPOSITIONS

[75] Inventors: Jose V. Saavedra; Douglas L. Hunter, both of Lake Jackson; Steve A. Sims, Angleton; Donald M. Maschmeyer; Thomas M. Knobel, both of Lake Jackson, all of Tex.

[73] Assignee: The Dow Chemical Company, Midland, Mich.

[21] Appl. No.: 938,221

[22] Filed: Dec. 5, 1986

[51] Int. Cl.$^4$ .............................................. C08G 18/14
[52] U.S. Cl. .................................... 521/105; 521/119; 521/120; 521/123; 36/32 R
[58] Field of Search ............... 521/105, 123, 119, 120; 136/32 R

[56] References Cited

U.S. PATENT DOCUMENTS

| | | | |
|---|---|---|---|
| 4,357,401 | 11/1982 | Andre et al. | 429/192 |
| 4,438,223 | 3/1984 | Hunter | 252/350 |
| 4,617,325 | 10/1986 | Knobel et al. | 521/105 |
| 4,618,630 | 10/1986 | Knobel et al. | 521/105 |
| 4,621,106 | 11/1986 | Fracalossi et al. | 521/123 |

FOREIGN PATENT DOCUMENTS 2442513  6/1980  France .
2442514  6/1980  France .

*Primary Examiner*—Morton Foelak
*Assistant Examiner*—Dennis R. Daley

[57] ABSTRACT

This invention is an antistatic polyurethane shoe sole which is prepared by reacting in a closed mold a reaction mixture comprising (a) a relatively high equivalent weight polyester polyol or a relatively high equivalent weight polyether polyol containing about 5-25 weight percent repeating units derived from ethylene oxide and about 75-95 weight percent repeating units derived from a C3-C6 cyclic ether, (b) a chain extender compound, in an amount from about 5 to about 40 parts per 100 parts of component (a), (c) a sufficient amount of a blowing agent to provide a density of about 10 to about 65 pounds per cubic foot, (d) a polyisocyanate, in an amount to provide about 0.9 to about 1.2 isocyanate groups per active hydrogen-containing group present in the reaction mixture, and (e) a non-volatile ionizable metal salt, in an amount from about 0.01 to about 1 part per 100 parts by weight of component (a), said reaction being conducted in the substantial absence of a carboxylic acid ester of 6-30 carbon atoms, a fatty acid salt and a phosphate ester compound.

18 Claims, No Drawings

ANTISTATIC POLYURETHANE SHOE SOLE COMPOSITIONS

BACKGROUND OF THE INVENTION

This invention relates to polyurethane shoe sole compositions which have the ability to dissipate a static electrical charge.

Elastomeric polyurethanes are widely used in the shoe industry to prepare soles for sports, leisure and dress shoes. For various reasons, it is desirable to provide a shoe which is antistatic. For example, shoes worn by persons who work with or handle electronic equipment are desirably antistatic, as antistatic footwear would reduce the possibility of static discharges occurring between the worker and other objects. These static discharges are often very damaging to electronic components.

In addition, certain medical applications and clean room operations require a dust-free environment. Antistatic footwear would reduce the tendency for dust and dirt to be introduced through electrostatic attraction to the wearer.

Another use is in explosive environments, where it is essential to prevent sparks.

Moreover, antistatic footwear would be desirable in everyday use, particularly in dry climates, to reduce annoying electrostatic discharges between the wearer and surrounding objects.

Several attempts have been made to render polyurethanes antistatic. For example, it is known to use topical antistatic agents such as quaternary ammonium compounds and surfactants to impart surface conductivity to the polyurethane. However, these agents are quickly and easily scuffed off in applications such as shoe soles. It is also known to incorporate conductive fillers and fibers into the polyurethane, but such fillers tend to alter the physical properties and processing characteristics of the polyurethane, rendering them unsuitable for the desired applications. These fillers and fibers must also be used in relatively large quantities, which often makes them relatively expensive.

In U.S. Pat. No.4,618,630 it is taught to render polyurethanes and other polymers antistatic by incorporating therein a certain ionizable salt in conjunction with an "enhancer" compound which augments the conductivity provided by the salt. The enhancer compound is a certain carboxylic acid ester or salt of a fatty acid. This antistatic additive provides excellent static dissipative properties to polyurethanes and other polymers. However, in some instances, the enhancer compound acts as a plasticizer for the polyurethane, altering its properties in an undesirable manner. For this reason, the antistatic agent described in that application is not preferred.

Accordingly, it is desirable to provide an antistatic polyurethane shoe sole which has excellent static dissipative properties. In such shoe sole, it is desirable to employ an antistatic agent which can be used in relatively low levels, and which does not significantly adversely affect the physical properties of the polyurethane.

SUMMARY OF THE INVENTION

This invention is an antistatic polyurethane shoe sole which is prepared by reacting in a closed mold a reaction mixture comprising (a) a relatively high equivalent weight polyester polyol, or a relatively high equivalent weight polyether polyol containing about 5-25 weight percent repeating units derived from ethylene oxide and about 75-95 weight percent repeating units derived from a $C_3$–$C_6$ cyclic ether and the residue from a polyhydric initiator, (b) a chain extender compound, in an amount from about 5 to about 40 parts per 100 parts of component (a), (c) a sufficient amount of a blowing agent to provide a density of about 10 to about 65 pounds per cubic foot, (d) a polyisocyanate, in an amount to provide about 0.9 to about 1.2 isocyanate groups per active hydrogen-containing group present in the reaction mixture, and (e) a non-volatile ionizable metal salt, in an amount from about 0.01 to about 1 part per 100 part by weight of component (a), said reaction being conducted in the substantial absence of a carboxylic acid ester of 6-30 carbon atoms, a fatty acid salt and a phosphate ester compound.

Surprisingly, the inclusion of a very small proportion of the ionizable metal salt in the substantial absence of an enhancer compound provides very good antistatic behavior to the shoe sole. Specifically, the antistatic agent minimally affects the properties of the polyurethane, and therefore can be dropped into the composition without making other formulation changes. Since the antistatic agent is dispersed throughout the polymer, its benefits are not lost due to erosion of the shoe sole surface. In addition, the antistatic agent does not significantly tend to exude out of the polyurethane over time, and therefore provides for relatively constant performance over the life of the shoe sole.

DETAILED DESCRIPTION OF THE INVENTION

The non-volatile, ionizable metal salt used as an antistatic agent in this invention is one containing at least one metal cation which is in ionic association with at least one anion. By ionizable, it is meant that the salt is one which provides mobile ions in the presence of an electric field.

The cation can be any metal which forms an ionizable salt with one or more anions, including those metals in Row 2, groups IA and IIA:, Row 3, groups IA, IIA and IIIA; Row 4, groups IA-IVA and IB-VIIIB; Rows 5 and 6, groups IA-VA and IB-VIIIB; and the lanthanide series of the Periodic Table of the Elements. Preferably, the metal is an alkali metal, an alkaline earth metal, Co, Ni, Fe, Cu, Cd, Zn, Sn, Al or Ag.

The anion is any which forms an ionizable salt with the metal cation. The anion is advantageously the conjugate base of an inorganic acid, a $C_2$–$C_4$ carboxylic acid or a tetraorganoboron ion. Suitable ions include, for example, the halides, i.e. $F-$, $Cl-$, $Br-$, and $I-$; $NO_3-$, $SCN-$, $SO_4^{2-}$, $HSO_4-$, $SO_3^{2-}$, $HSO_3-$, $ClO_4-$, $CO_3^{2-}$, $PO_4^{3-}$, $_2PO_4-$, $HPO_4^{2-}$, $PO_3^{3-}$, $HPO_3^{2-}$, $HPO_2PO_3-$, $CF_3SO_3-$acetate, tetraorganoboron, particularly tetraalkyl and tetraphenylboron and the like. Of these, the tetraorganoborons, $SCN-$salts, $CF_3SO_3-$salts and the acetates are preferred on the basis of generally better performance and low corrosion. Most preferred are SCN- and tetraphenylboron ion, which are less reactive with metals, water or other materials which are often present in the polymer or come in contact with the polymer than are most other anions. The most preferred salt is a monovalent metal tetraphenylboron salt.

The most preferred monovalent metal tetraphenylboron salt used herein is any salt of a monovalent metal and the tetraphenylboron anion. Among the tetraphenylboron salts, the monovalent metal is preferably one in Group 1 of the Periodic Table of the Elements (an alkali metal) and is more preferably potassium or sodium. Sodium tetraphenylboron is most preferred.

Other preferred salts include lithium nitrate, cobalt nitrate, sodium acetate, cadmium acetate, zinc acetate, sodium thiocyanate, lithium thiocyanate, potassium thiocyanate and the like.

A surprising aspect of this invention is that very little of the ionizable metal salt is required to provide excellent antistatic behavior. From about 0.01 to about 1, preferably about 0.05 to about 0.5 part of the ionizable metal salt is advantageously used per 100 parts of the relatively high equivalent weight polyol. When the relatively high equivalent weight polyol is a polyether polyol as described herein, about 0.05 to about 0.25 part of the ionizable metal salt are most preferred per 100 parts of the polyol.

The polyurethane shoe sole is the reaction of a reaction mixture comprising a polyisocyanate, a certain polyol, a chain extender, a blowing agent and the antistatic agent.

Both aliphatic and aromatic diisocyanates are useful in this invention. Suitable aromatic diisocyanates include, for example, m-phenylene diisocyanate, p-phenylene diisocyanate, 2,4- and/or 2,6-toluene diisocyanate (TDI), naphthylene-1,5-diisocyanate, 1-methoxyphenyl-2,4-diisocyanate, 4,4'biphenylenediisocyanate, 3,3'-dimethoxy-4,4'biphenyldiisocyanate, 2,4'- and/or 4,4'-diphenylmethanediisocyanate (MDI) and derivatives thereof. Preferred among the aromatic polyisocyanates are the isomers and derivatives of TDI and MDI.

Exemplary aliphatic polyisocyanates include isophorone diisocyanate, cyclohexane diisocyanate, hydrogenated diphenylmethanediisocyanate (H12MDI), 1,6-hexamethylenediisocyante and the like. Of these, hexamethylenediisocyanate and H12MDI are most preferred.

Biuret, urethane, urea, uretonimine and/or carbodiimide containing derivatives, including prepolymers, of the foregoing polyisocyanates are also suitable.

In preparing the polyurethane, the polyisocyanate is employed in an amount to provide about 0.9 to about 1.2, preferably about 0.95 to about 1 15, more preferably about 0.95 to about 1.05, isocyanate groups per active hydrogen-containing group present in the reaction mixture. Lesser amounts of polyisocyanate produce an inadequately cured polymer whereas greater amounts thereof tend to form undesirable crosslinking.

The relatively high equivalent weight polyol comprises a polyester polyol or a polyether polyol containing repeating units derived from ethylene oxide. The relatively high equivalent weight polyol advantageously has an equivalent weight from about 400 to about 3000, preferably about 700 to about 2500, more preferably about 1000 to about 2500. The polyol also advantageously has an average functionality of from about 1.5 to about 4, preferably from about 1.7 to about 3.

Examples of suitable hydroxyl-containing polyesters include those obtained by reacting polycarboxylic acids with polyhydric polyols. Examples of suitable polycarboxylic acids include oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, c-hydromuconic acid, β-hydromuconic acid, α-butyl-α-ethyl-glutaric acid, α,β-diethylsuccinic acid, isophthalic acid, terephthalic acid, hemimellitic acid, and 1,4-cyclohexanedicarboxylic acid. Any suitable polyhydric alcohol including both aliphatic and aromatic types may be used, such as ethylene glycol, 1,3-propane diol, 1,4-butane diol, 1,3-butane diol, 1,2-butane diol, 1,5-pentane diol, 1,4-pentane diol, 1,3-pentane diol, 1,6-hexane diol, 1,7-heptane diol, diethylene glycol, triethylene glycol, dipropylene glycol, glycerol, 1,1,1-trimethylolpropane, 1,1,1-triethylolethane, hexane-1,2,6-triol, α-methylglucoside, pentaerythritol and sorbitol. Also included within the term "polyhydric alcohol" are compounds derived from phenols such as 2,2-(4,4'-hydroxyphenyl)propane, commonly known as bisphenol A, bis (4,4'hydroxylphenyl) sulfide, and bis (4,4'-hydroxyphenyl) sulfone.

The polyether polyol useful herein is a copolymer of ethylene oxide and a $C_3$–$C_6$ cyclic ether. The polyether polyol contains from about 5 to about 25, preferably about 10 to about 20 weight percent repeating units derived from ethylene oxide and about 95 to about 75, preferably about 90 to about 80 weight percent repeating units derived from a $C_3$–$C_6$ cyclic ether and residue from a polyhydric initiator. The $C_3$–$C_6$ cyclic ether is advantageously propylene oxide, 1,2-butylene oxide, 2,3-butylene oxide, tetramethylene oxide, 1,2-hexane oxide, and the like, with propylene oxide and the butylene oxide isomers being preferred and propylene oxide being especially preferred. The repeating units derived from ethylene oxide can be randomly dispersed within the polyether molecule, or may be present in the form of one or more blocks of poly(ethylene oxide). Most preferably, the repeating units derived from ethylene oxide are present at terminal end-caps, as such end-caps provide terminal primary hydroxyl groups which make the polyol more reactive with a polyisocyanate. These most preferred polyether polyols have the added advantage of being relatively insensitive to moisture, so that the polyurethane prepared therefrom tends to absorb little atmospheric moisture.

In addition to the relatively high equivalent weight polyol, a chain extender is employed in the reaction mixture. Such chain extender is a relatively low (preferably about 31–200) equivalent weight material having from about 2 to about 4, preferably about 2 active hydrogen-containing groups per molecule. The active hydrogen-containing groups are advantageously hydroxyl or amine groups. Preferred chain extenders include α,ω-alkylene glycols such as ethylene glycol, 1,3-propylene glycol, 1,4-butanediol; low equivalent weight glycol ethers such as diethylene glycol, triethylene glycol, dipropylene glycol, tripropylene glycol and the like, and aromatic diamines such as diethyltoluenediamine, methylene dianiline, methylene bis(o-chloroaniline), and the like. Preferred chain extenders include ethylene glycol, diethylene glycol, 1,4-butane diol, diethyltoluenediamine and mixtures thereof.

The chain extender is present in an amount from about 5 to about 40, preferably about 7 to about 20 parts per 100 parts by weight of the relatively high equivalent weight polyol.

In addition to the foregoing components, a blowing agent is present in the reaction mixture. Sufficient of the blowing agent is present to provide a polyurethane shoe sole having a density from about 10 to about 65, preferably about 15 to about 50 pounds per cubic foot. Suitable blowing agents include water, halogenated methanes such as methylene chloride, dichlorodifluoromethane, trifluoromonochloromethane and the like, the so-called "azo" blowing agents, finely divided solids and the like. Preferred are water and the halogenated methanes, or mixtures thereof. Water, in an amount from about 0.1 to about 2 parts per 100 parts relatively high equivalent weight polyol, is most preferred.

In addition to the foregoing components, the reaction mixture may also contain various optional components. One preferred component is a catalyst for the reaction of the polyisocyanate with the various active hydrogen-containing materials in the mixture. Suitable catalysts include organometallic compounds and tertiary amine compounds. Of the organometallic catalysts, organotin catalysts such as dimethyltindilaurate, dibutyltindilaurate, stannous octoate and the like are preferred. Other useful organometallic catalyst are disclosed, for example, U.S. Pat. No. 2,846,408, incorporated herein by reference. Suitable tertiary amine compounds include triethylenediamine, N-methyl morpholine, N-ethyl morpholine, diethylethanolamine, N-coco morpholine, 1-methyl-4-dimethylaminoethyl piperazine, 3-methoxy-N-dimethylpropylamine, N,N-diethyl-3-diethylaminopropylamine, dimethylbenzyl amine and the like. Mixtures of tertiary amine and organotin catalysts are also useful. Advantageously, about 0.01 to about 0.5 part by weight of an organometallic catalyst and/or about 0.05 to about 2 parts of a tertiary amine catalyst are used per 100 parts relatively high equivalent weight polyol.

As stated before, a $C_6$-$C_{30}$ carboxylic acid ester, a fatty acid salt and a phosphate ester are substantially absent from the reaction mixture. However, these materials may be used in very small amounts, i.e., 1 or less part per 100 parts relatively high equivalent weight polyol, as, for example, surfactants. Most preferably, essentially none of these materials are present.

A surfactant may be used in the reaction mixture to stabilize the foaming reaction mixture until it is sufficiently cured to maintain a cellular structure. Suitable surfactants include silicone surfactants. Fatty acid salts, although known to be useful surfactants, are not preferred and are preferably absent. In addition, components such as fillers, fibers, internal mold release additives, cell openers, preservatives, pigments and other colorants, antioxidants and the like may be employed as is well known in the art. A preferred cell opener is a poly(ethylene oxide) diol having an equivalent weight from about 500–2000, or a copolymer of ethylene oxide and a minor amount of propylene oxide.

An especially preferred reaction mixture comprises about 100 parts of a polyether polyol blend, which blend contains about 0–60 parts of a trifunctional, ethylene oxide-capped polyether and about 100–40 parts of a difunctional, ethylene oxide-capped polyether, about 8–15 parts of 1,4-butanediol, about 0.05 to about 0.25 part of sodium tetraphenylboron, about 58 parts of a 170–200 equivalent weight isocyanate-terminated prepolymer prepared by reacting an excess of MDI with a low equivalent weight diol, and suitable catalysts, blowing agents and surfactants.

In preparing the shoe sole from the reaction mixture either a one-step or two-step process can be used. In the one-step process, the chain extender and most or all of the polyol are simultaneously reacted with the polyisocyanate in a closed mold. Such reaction is advantageously carried out at a temperature of about 30°–150° C., preferably about 30°–60° C. for a period of time at least sufficient to cure the shoe sole to a state where it will maintain its shape during demolding and subsequent handling. If desired, the shoe sole can be substantially completely cured in the mold. If incomplete in-mold curing is performed, post-curing is usually required. Typical post-curing conditions include a temperature from about 30°–150° C. for about 2 to about 24 hours. In the two-step process, all or a major portion of the polyol are reacted with the polyisocyanate in a first step to form a prepolymer or quasi-prepolymer. The conditions for forming the prepolymer or quasi-prepolymer advantageously include a temperature of about 20°–100° C. This prepolymer or quasi-prepolymer is reacted in a second step with the chain extender and any remaining polyol in a closed mold to form the shoe sole, using molding conditions as described for the one-step process. The most preferred method is a one-shot method wherein the sole is molded at about 20°–60° C. for about 1–5 minutes, and then demolded, with no further post-curing at an elevated temperature.

The shoe sole can be molded in a first operation and subsequently attached to the uppers. Alternatively, the shoe sole may be molded directly around to lower portion of the upper, thereby forming the sole in place. This latter method is particularly suitable when a polyester polyol is used.

The following examples are provided to illustrate the invention but are not intended to limit the scope thereof. All parts and percentages are by weight unless otherwise indicated.

EXAMPLE 1

Shoe sole sample nos. 1–2 and comparative sample A are prepared from the following base formulation:

TABLE 1

| Polyol A[1] | 50 parts by weight |
| Polyol B[2] | 50 parts by weight |
| 1,4-butanediol | 10 parts by weight |
| triethylenediamine | 0.45 parts by weight |
| dimethyltindilaurate | 0.03 parts by weight |
| CFCl$_3$ | 5 parts by weight |
| water | 0.15 parts by weight |
| antistatic agent[3] | variable |
| MDI prepolymer[4] | 55.21 parts by weight |

[1] A 6000 molecular weight trifunctional poly(propylene oxide) containing 13.5 weight percent terminal ethylene oxide capping.
[2] A 4000 molecular weight difunctional poly(propylene oxide) containing 18 weight percent terminal ethylene oxide capping.
[3] The type and amount of antistatic agent are as indicated in Table 2 following.
[4] A 181 equivalent weight MDI prepolymer commercially available from The Dow Chemical Company under the trade name Isonate 181.

Shoe sole sample nos. 3–8 are prepared from a like formulation, except that 13 parts of Polyol A are replaced with Polyol C, a 4800 molecular weight trifunctional random copolymer of 80% ethylene oxide and 20% propylene oxide.

The shoe soles are prepared by dissolving the amine catalyst into the 1,4-butanediol at about 50° C., and mixing this solution with all of the other components except the prepolymer. This mixing is done for about 30–60 seconds with rapid stirring. The prepolymer is then quickly added, followed by mixing for about 6–10 seconds, and the resulting mixture is then poured into a mold which is preheated to 50° C. After curing for 5 minutes, while maintaining the mold at 50° C., the sole is demolded. After cooling, the electrical properties of the soles are measured, with results as indicated in Table 2 following. The static ay time is the time required for the shoe sole to dissipate an applied static charge of 5000 volts direct current. It is measured according to Federal Test Method 101C, Method 4046, omitting the water step as suggested in the Electronics Industry Association Interim Standard IS-5. Lower times are better. Surface resistivity is measured according to ASTM D257. Lower values indicate better conductivity.

TABLE 2

| Sample No. | Antistatic Agent | Amount (parts) | Static Decay Time, (sec) | Surface Resist., (log ohms) |
|---|---|---|---|---|
| A* | None | 0 | 18.9 | 13.64 |
| 1 | Na(Ph)$_4$B | 0.11 | 0.01 | 10.58 |
| 2 | Na(Ph)$_4$B | 0.5 | 0.01 | 10.08 |
| 3 | LiCF$_3$SO$_3$ | 0.5 | 0.1 | 11.58 |
| 4 | NaCF$_3$SO$_3$ | 0.5 | 0.07 | 11.38 |
| 5 | NaSCN | 0.36 | 0.2 | 11.91 |
| 6 | Na(Ph)$_4$B | 0.1 | 0.01 | 10.72 |
| 7 | Na(Ph)$_4$B | 1.0 | 0.01 | 10.18 |
| 8 | Na(Ph)$_4$B | 0.5 | 0.01 | 10.18 |

As can be seen from the data in Table 2, the incorporation of very small amounts of antistatic agents provide dramatic improvements in static decay time and surface resistivity. Furthermore, by comparing, for example, sample nos. 1 and 2, or 6 and 7, it is seen that increasing the amount of antistatic agent does not substantially improve the electrical properties.

EXAMPLE 2

Comparative Sample B is prepared from the formulation described in Table 1, except that 11 parts of 1,4-butanediol and 0.5 part of water are used. Sample No. 9 is prepared from a like formulation, this time including 0.14 part of sodium tetraphenylboron. All of the components except the prepolymer are blended as described in Example 1. The resulting blend is then reacted with the prepolymer using a low pressure casting machine, and injected into a 8"×8"×X$\frac{1}{2}$" mold, where it is cured for 3 minutes at 45° C. The physical and electrical properties of the resulting polyurethanes are determined, with results as reported in Table 3 following.

TABLE 3

| Sample No. | B* | 9 |
|---|---|---|
| Property | | |
| Tensile Strength, psi[1] | 520 | 552 |
| Elongation, %[1] | 404 | 424 |
| Shore A Hardness[2] | 58 | 60 |
| Density, g/cc[3] | 0.48 | 0.48 |
| Ross Flex, mm cut growth[4] | 0 | 1.2 |
| Static Decay Time, sec[5] | 19 | 0.01 |
| Surface Resistivity, 45% R.H., ohms[6] | N.D. | 9.6 × 10$^9$ |

[1]ASTM D-412
[2]ASTM D-2240
[3]ASTM D-792
[4]ASTM D-1052, 150,000 cycles, with backed samples
[5]Federal Test Method 101C, Method 4046, omitting the water step as suggested in the Electronics Industry Association Interim Standard IS-5
[6]ASTM D-257

As can be seen from the data reported in Table 3, the incorporation of the antistatic agent of this invention provides excellent electrical properties while having negligible effect on the physical properties of the polyurethane. A shoe sole prepared from the same formulation as Sample No. 9 exhibits a surface resistivity of 2.2×10$^{11}$ at 7% relative humidity (R H.), and 7.7×10$^{10}$ at 35% R.H. It exhibits a volume resistivity of 1.2×10$^{11}$ at 7% R.H. and 1.5×10$^{10}$ at 35% R.H.

EXAMPLE 3

Following the general procedure described in Example 1 shoe sole sample nos. 10-12 and comparative sample C are prepared from the formulation described in Table 4. The antistatic agent used in Examples 10-12 is sodium tetraphenylboron, in amounts as indicated in Table 5. The electrical properties of these shoe soles are then tested, with results as indicated in Table 5.

TABLE 4

| Polyol D[1] | 100 parts by weight |
|---|---|
| 1,4-butanediol | 16 parts by weight |
| amine catalyst solution[2] | 0.7 parts by weight |
| dimethyltindilaurate | 0.06 parts by weight |
| silicone surfactant | 1.0 parts by weight |
| water | 0.3 parts by weight |
| sodium tetraphenylboron | variable |
| MDI prepolymer[3] | 115 parts by weight |

[1]A 1000 equivalent weight difunctional polyester polyol.
[2]A 33 weight percent solution of triethylene diamine in dipropylene glycol.
[3]An MDI prepolymer having an isocyanate content of 18.6%, commercially available from The Dow Chemical Company under the trade name Isonate 240.

TABLE 5

| Sample No. | Amount Antistatic Agent (parts) | Static Decay Time, (sec) | Surface Resistivity, (log ohms) |
|---|---|---|---|
| C* | 0 | 2.3 | 13.15 |
| 10 | 0.11 | 0.13 | 11.72 |
| 11 | 0.5 | 0.07 | 11.32 |
| 12 | 1.0 | 0.02 | 11.23 |

As can be seen from the data in Table 5, excellent electrical properties are obtained with the used of very low levels of an antistatic agent according to this invention. The minor improvement in properties between Sample Nos. 11 and 12 indicates that greater quantities of antistatic agent do not significantly improve the electrical properties.

The physical properties of shoe sole Sample No. 10 and comparative sample C are tested and are as reported in Table 6.

TABLE 6

| Sample No. | C* | 10 |
|---|---|---|
| Tensile Strength, psi[1] | 448 | 338 |
| Elongation, %[1] | 306 | 290 |
| Shore A hardness[2] | 88 | 68 |
| Density, g/cc[3] | 0.449 | 0.435 |
| Ross flex, mm cut growth[4] | 0 | 0 |
| Split Tear Strength, pli[5] | 52 | 53 |

[1-4]Same as notes 1-4 in Table 3.
[5]ASTM D-3574

What is claimed is:

1. An antistatic polyurethane shoe sole which is prepared by reacting in a closed mold a reaction mixture comprising
    (a) a relatively high equivalent weight polyester polyol, or a relatively high equivalent weight polyether polyol containing about 5-25 weight percent repeating units derived from ethylene oxide and about 75-95 weight percent repeating units derived from a C$_3$-C$_6$ cyclic ether, (b) a chain extender compound, in an amount from about 5 to about 40 parts per 100 parts of component (a), (c) a sufficient amount of a blowing agent to provide a density of about 10 to about 65 pounds per cubic foot, (d) a polyisocyanate, in an amount to provide about 0.9 to about 1.2 isocyanate groups per active hydrogen-containing group present in the reaction mixture, and (e) a non-volatile ionizable metal salt, in an amount from about 0.01 to about 1 part per 100 parts by weight of component (a), said reaction being conducted in the substantial absence of a carboxylic acid ester of 6-30 carbon atoms, a fatty acid salt and a phosphate ester compound.

2. The antistatic shoe sole of claim 1 wherein the non-volatile ionizable metal salt is an alkali metal salt in which the anion is a tetraorganoboron, SCN—, or $CF_3SO_3$—.

3. The antistatic shoe sole of claim 2 wherein the non-volatile ionizable metal salt is sodium tetraphenylboron, sodium thiocyanate, or $NaCF_3SO_3$.

4. The antistatic shoe sole of claim 2 wherein the chain extender is an $\alpha,\beta$-alkylene glycol having from about 2 to about 4 carbon atoms.

5. The antistatic shoe sole of claim 4 wherein component (a) comprises a mixture of from about 0 to about 60 weight percent of a trifunctional, ethylene oxide-capped polyether and about 100-40 weight percent of a difunctional, ethylene oxide-capped polyether.

6. The antistatic shoe sole of claim 5 wherein component (a) has an average equivalent weight of about 1000 to about 2500.

7. The antistatic shoe sole of claim 6 wherein the non-volatile metal salt comprises sodium tetraphenylboron, and said non-volatile metal salt is present in an amount from about 0.05 to about 0.25 parts per 100 parts of component (a).

8. The antistatic shoe sole of claim 4 wherein component (a) is a polyester polyol having an average equivalent weight of about 1000 to about 2000.

9. The antistatic shoe sole of claim 8 wherein the non-volatile metal salt comprises sodium tetraphenylboron.

10. The antistatic shoe sole of claim 1 wherein component (a) is a relatively high equivalent weight polyether polyol containing about 5-25 weight percent repeating units derived from ethylene oxide and about 75-95 weight percent repeating units derived from a $C_3$-$C_6$ cyclic ether.

11. The antistatic shoe sole of claim 2 wherein component (a) is a relatively high equivalent weight polyether polyol containing about 5-25 weight percent repeating units derived from ethylene oxide and about 75-95 weight percent repeating units derived from a $C_3$-$C_6$ cyclic ether.

12. The antistatic shoe sole of claim 3 wherein component (a) is a relatively high equivalent weight polyether polyol containing about 5-25 weight percent repeating units derived from ethylene oxide and about 75-95 weight percent repeating units derived from a $C_3$-$C_6$ cyclic ether.

13. The antistatic shoe sole of claim 1 wherein component (a) comprises mixture of from about 0 to about 60 weight percent of a trifunctional, ethylene oxide-capped polyether and about 100 to about 40 weight percent of a difunctional, ethylene oxide-caped polyether.

14. The antistatic shoe sole of claim 2 wherein component (a) comprises a mixture of from about 0 to about 60 weight percent of a trifunctional, ethylene oxide-capped polyether and about 100 to about 40 weight percent of a difunctional, ethylene oxide-caped polyether.

15. The antistatic shoe sole of claim 1 wherein component (a) is a relatively high equivalent weight polyester polyol having an average equivalent weight of from about 700 to about 2500 and having an average functionally of from about 1.5 to about 4.

16. The antistatic shoe sole of claim 2 wherein component (a) is a relatively high equivalent weight polyester polyol having an average equivalent weight of from about 700 to about 2500 and having an average functionality of from about 1.5 to about 4.

17. The antistatic polyurethane shoe sole of claim 1 wherein component (a) comprises a mixture of relatively high equivalent weight polyester polyols or relatively high equivalent weight polyether polyols containing an average of about 5-25 weight percent repeating units derived from ethylene oxide and about 75-95 weight percent repeating units derived from a $C_3$-$C_6$ cyclic ether.

18. The antistatic polyurethane shoe sole of claim 1 wherein there is less than about one part by weight of carboxylic acid esters of 6-30 carbon atoms, fatty acid salts and phosphate ester compounds per 100 parts by weight of relatively high equivalent weight polyols.

* * * * *

UNITED STATES PATENT AND TRADEMARK OFFICE
CERTIFICATE OF CORRECTION

PATENT NO.  : 4,861,805

DATED     : August 29, 1989

INVENTOR(S) : Jose V. Saavedra, Douglas L. Hunter, Steve A. Sims, Donald M. Maschmeyer and Thomas M. Knobel It is certified that error appears in the above-identified patent and that said Letters Patent is hereby corrected as shown below:

Column 2, line 59 please delete "$_2PO_4-$" and insert -- $H_2PO_4-$ --.

Column 2, line 60 please delete "$HPO_2PO_3-$" and insert -- $H_2PO_3-$ --.

Column 3, line 40 please delete "(H12MDI)" and insert -- ($H_{12}MDI$) --.

Column 3, line 42 please delete "H12MDI" and insert -- $H_{12}MDI$ --.

Column 3, line 49 please delete "1 15" and insert -- 1.15 --.

Column 4, lines 3-4 please delete "c-hydromuconic" and insert -- ɑ-hydromuconic --.

Column 7, line 2 please delete "ay" and insert -- decay --.

Signed and Sealed this

Thirtieth Day of April, 1991

Attest:

HARRY F. MANBECK, JR.

Attesting Officer

Commissioner of Patents and Trademarks